United States Patent [19]
Orlov

[11] Patent Number: 5,305,551
[45] Date of Patent: Apr. 26, 1994

[54] COLUMN PLANTER

[75] Inventor: Dov Orlov, Kfar Maimon, Israel

[73] Assignee: Gro-Max Systems, Inc., Dover, Fla.

[21] Appl. No.: 712,811

[22] Filed: Jun. 10, 1991

[51] Int. Cl.$^5$ .............................................. A01G 25/00
[52] U.S. Cl. .......................................... 47/82; 47/79
[58] Field of Search ..................... 47/79, 82, 62, 39

[56] References Cited

U.S. PATENT DOCUMENTS

| | | | |
|---|---|---|---|
| 3,841,023 | 10/1974 | Carlyon | 47/79 |
| 4,006,559 | 2/1977 | Carlyon | 47/82 |
| 4,419,843 | 12/1983 | Johnson | 47/82 |
| 4,829,709 | 5/1989 | Centafanti | 47/82 |
| 5,127,366 | 7/1992 | Kim | 47/79 |

*Primary Examiner*—Henry E. Raduazo
*Attorney, Agent, or Firm*—Browdy and Neimark

[57] ABSTRACT

There is provided a column planter including a tank to be filled with water, a plurality of planting pots stackable on top of each other, to form at least one column of stacked pots, each pot having a central opening in its bottom, as well as a plurality of drainage holes, and a substantially vertical, substantially rigid tube for each column on which tube, with their central openings, are strung the pots of the column. The lower end of the tube is supported in the tank and the tube is of such length as to at least protrude beyond the soil surface of the uppermost pot in a column and an emitter is attached to the upper end of the vertical tube. There are further provided mounting and supporting members for affixing the column of pots on the tank, and a pump having an inlet and an outlet opening and adapted to draw water from the tank. The outlet opening is operatively connected to the lower end of the vertical tube into which the pump forces the water drawn from the tank, to be issued from the emitter at the upper end of the tube, wherein water issuing from the emitter trickles down, passing from one pot into another pot therebelow through the drainage holes, and returns to the tank to be recirculated by the pump.

12 Claims, 3 Drawing Sheets

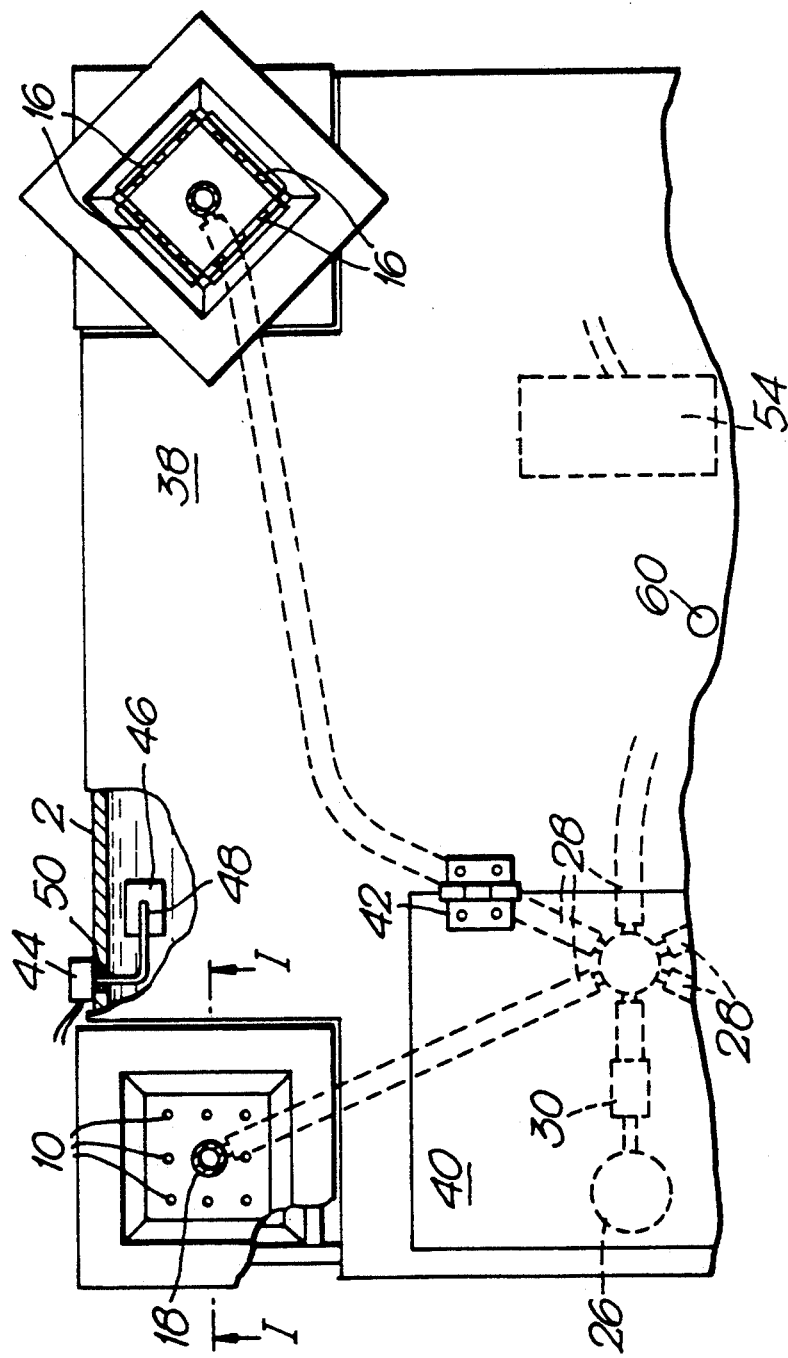

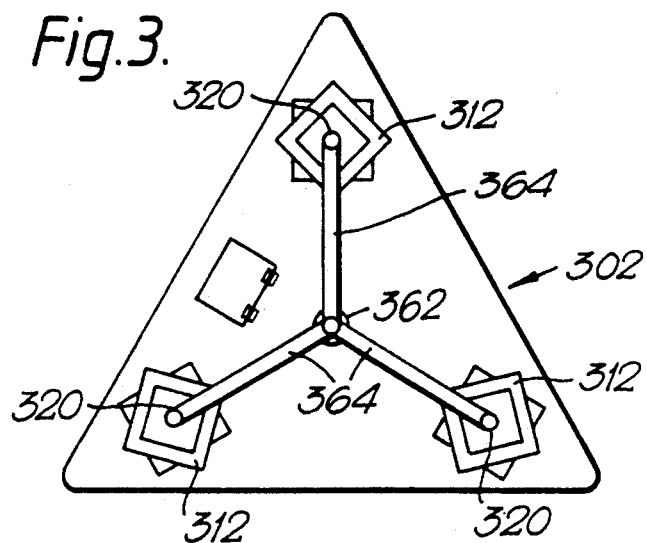
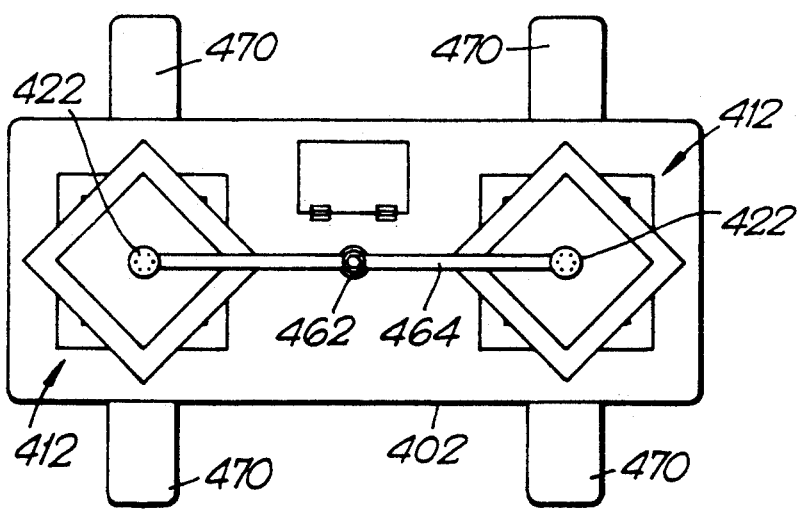
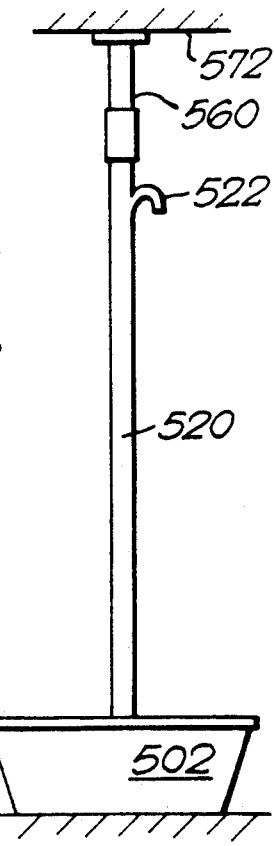

COLUMN PLANTER

The present invention relates to a system for growing plants, and more particularly, to a system in which pots for plants to be grown are mounted on top of each other, constituting columns, and which provides a recirculating irrigation system for the plants.

There is known a planter in which the plants in the columns of planting pots are irrigated by means of a system comprising two pipelines. One line extends along a row of the columns on a level somewhat higher than the upper ends of the uppermost pots of the columns and serves to supply water to the pots, and another line extends along ground level and serves to collect water drained from the columns of pots and to return it to the input of a pump which feeds water to the upper pipe-line. Each column has a central tube which stabilizes the column. This planter system, while being especially suitable for growing plants over large areas, has several drawbacks, e.g. all columns are connected, with each other, as well as with a source of water and with a drainage tank. In case of need for removal of one of the column units (i.e., for replacement or repair), it is necessary to interrupt the irrigation of the other columns as well as for performing time-consuming connection/disconnection operations in the pipelines. Also, a significant leak in one of the pipelines can lead to a disturbance in irrigation of all the column units.

It is one of the objects of the present invention to provide a column planter not connected to an external water source and to an external drainage tank.

It is another object of the invention to provide self-contained column planter units of minimal dimensions and costs.

According to the invention, this is achieved by providing a column planter comprising a tank adapted to contain water, a plurality of planting pots stackable on top of each other, to form at least one column of stacked pots, each pot having a central opening in its bottom, as well as a plurality of drainage holes, a substantially vertical, substantially rigid tube for each column on which tube, with their central openings, are strung said pots of said column, the lower end of which tube is supported in said tank, said tube being of such length as to at least protrude beyond the soil surface of the uppermost pot in a column, an emitter attached to the upper end of said vertical tube, means for mounting and supporting said column of pots on said tank, and a pump having an inlet and an outlet opening and adapted to draw water from said tank, which outlet opening is operatively connected to the lower end of said vertical tube into which said pump forces said water drawn from said tank, to be issued from said emitter at the upper end of said tube, wherein water issuing from said emitter trickles down, passing from one pot into another pot therebelow through said drainage holes, and returns to said tank to be recirculated by said pump.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2 represents a partial top view of the planter of FIG. 1, and

FIGS. 3-5 represent alternative schematic arrangements of the planter, according to the invention.

Figure 1:
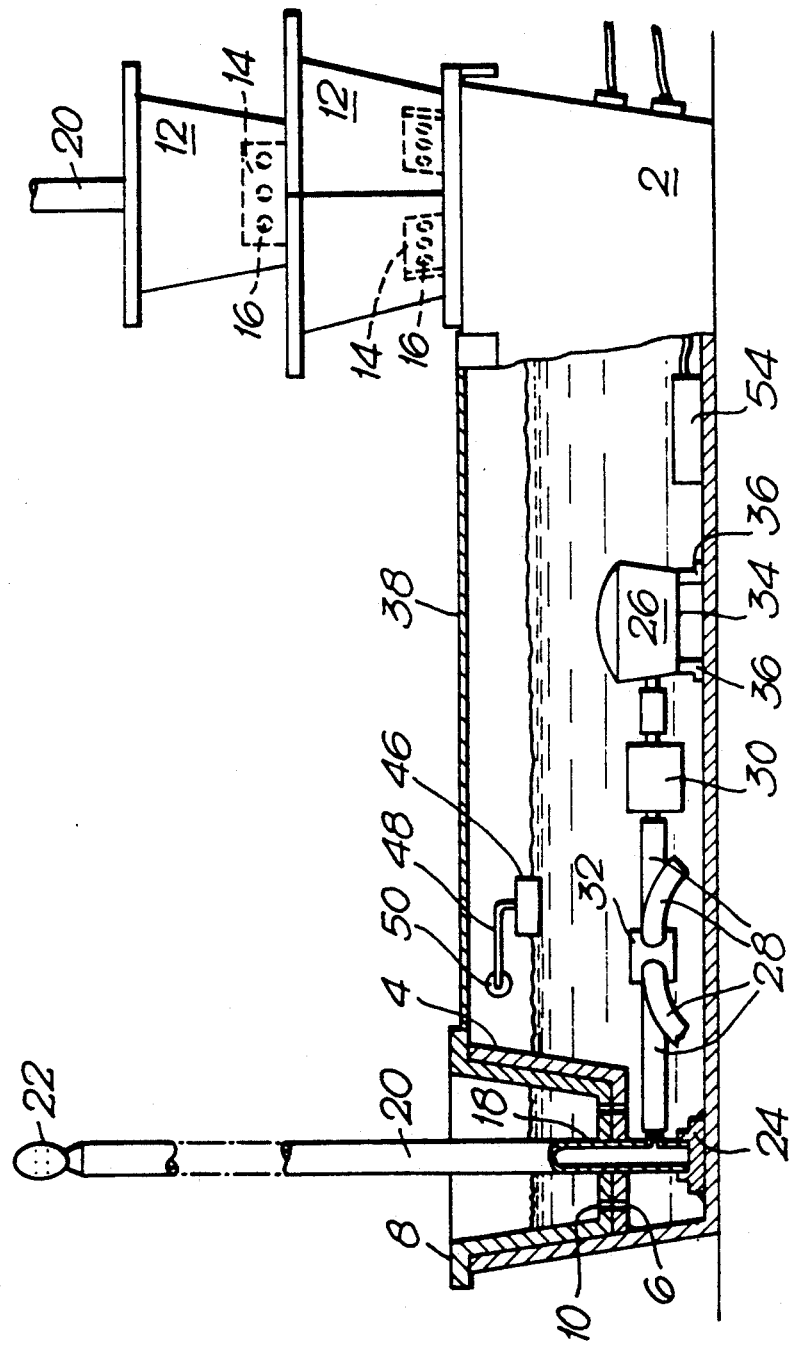
FIG. 1 represents a side view of a planter unit in partial cross-section along Plane I—I in FIG. 2.

Referring now to the drawings, there is seen in FIG. 1 a rectangular tank 2 with rigid walls, having a column of vertical pots 12, desirably nine, at each corner. To the internal surfaces of each corner of the tank 2 may be welded a basket-like structure 4 having the same internal dimensions as are the external dimensions of the planting pots 12 making up the columns. Alternatively, the cover 38 of the tank 2 may simply have an opening therein of size and shape, adapted to receive at least the lower portion e.g. one-third to one-half, of such pots 12. The bottom of each of the baskets 4 has a plurality of perforations 6. A container 8 having the same internal and external overall dimensions as are the internal and external overall dimensions of the pots 12, and with bottom perforations 10 aligned with the perforations 6 in the baskets 4, is inserted into each of the baskets. The container 8 and the pots 12 are advantageously manufactured from the same plastic material. All the containers 8 are inserted into their respective baskets 4 and immersed in water, serving, as they do, only as bases for the respective columns, but not for growing plants. Preferably, however, the baskets 4 and the containers 8 are not present, and a pot 12 merely sits in an opening in the cover 38.

Each pot 12 has four side walls, on the external surfaces of which there are provided recesses 14 with drainage holes 16 at the level of the inside bottom surfaces of the pots, and preferably, there are additional drainage holes in the bottom wall of each pot 12. Each pot 12 is advantageously the same size and in a column is angularly offset by 45° with respect to the next-lower pot. In addition to drainage holes 16 in the side wall(s) near the bottom of pots 12, which may or may not be provided, each of the bottoms has a central opening 18 for a rigid central PVC tube 20 fitting the openings 18 in the pots 12, which tube serves not only for aligning the pots 12 and stabilizing the column but also for supplying water from the tank 2 to a drip-irrigation or bubbler emitter 22 which is mounted at the upper end of the tube 20. The lower end of the latter is closed by a support 24 on the bottom of the tank 2 into which this end is inserted, or it may simply be fit into an elbow joint connected to a water feeding pipe 28.

A submersed electric pump 26, advantageously working on low voltage, is resting on the bottom of the tank 2 or is attached to the bottom wall of a lid 40 and supplies water from the tank 2 (at- a pressure head exceeding the height of the columns) to the water feeding pipe 28, which may be flexible tubing or rigid, via a fine filter 30 and a distributor 32. The pump 26 is provided with a coarse filter 34 which screens its inlet opening (not shown) and with supporting legs 36. From the distributor 32, lengths of tubing 28 lead to each of the central tubes 20 of the columns.

The tank 2 is closed by the cover 38 in which is provided an access opening closed by the lid 40, which may be articulated to the cover 38 by means of hinges 42 so that one can reach the pump 26 and the fine filter 30 without removing the cover 38. A float-actuated microswitch 44 is preferably attached to one of the tank walls and produces an alarm signal whenever the water level in the tank 2 drops below a certain minimum. The microswitch 44 is connected to a float 46 via a crank lever 48 which passes through a seal 50. There may be provided a halogen lamp on a pole of appropriate height (not shown) for intensifying plant growth in the absence of sunlight. There are also provided a submerged electric, thermostat-controlled heating element 54 for heating the water during cold spells or for purposes of sterilization, and a timer (not shown) for turning the pump 22 periodically on and off, in accordance with seasonal or plant-determined irrigation requirements.

The lid 40 is also provided with a hole 60 therethrough for retention therein of a secondary support post, not illustrated for the embodiments of FIGS. 1 and 2. Such a post has, at its upper end, stabilizing arms extending to and stabilizing each of the central tubes 20.

FIGS. 3-5 schematically show other arrangements wherein the tank has a different configuration so as to support a different number of columns of pots. Thus, FIG. 3 shows a tank 302 of generally equilateral triangular configuration. A secondary support post 362 is connected via stabilizing arms 364 or the like to the portion of the tubes 320 extending above the uppermost pot 312.

In FIG. 4 the tank 402 is rectangular and relatively narrow and so has support feet 470 extending horizontally outwardly to provide stability. In FIG. 4 the columns of pots are shown schematically at 412, in this embodiment there being only two such columns. Again a secondary support post 462 is provided for stability, same being connected to the upper ends of tubes 420 below the bubbler/irrigators 422 by means of a stabilizing arm 464.

In the embodiment illustrated in FIG. 5 there is shown only the small tank 502 and the central pipe 520 which in this embodiment serves three functions, namely, it supports the pots (not shown), it carries water upwardly to the emitter 522, both of these functions being the same as in the other embodiments, and it also serves to stabilize the entire structure similar to the secondary support posts 362 and 462 of the embodiments of FIGS. 3 and 4, but in this case by means of a spring biased telescoping section 560 which is adapted to abut against a ceiling 572 much the same as is commonly used in "pole-lamps".

In operation, pump 26 is pumping water from tank 2, which water passes successively through coarse filter 34, pump 26, fine filter 30, tubing 28, tubes 20 and bubbler/drip-irrigation emitters 22. The water then enters the uppermost planting pot 12, trickles through the soil in the pot and leaves via drainage holes 16 for the next-lower pot. After passing through the entire column, whatever is not absorbed by the pots, returns to the tank 2 via drainage holes 6 at the bottom of basket 4, to be recirculated. This method of feeding water through the central tube has two advantages, first, that the column planter has a more attractive appearance because of the absence of overhead and ground pipelines, and secondly, that a more uniform heating of the planting medium in the pots 12 throughout the height of the column, is attainable while using the heating element 54.

This phenomenon can be explained by the fact that water passes not only from top to bottom of the column, as prevails in the prior-art planters, but also from bottom to top, through the central tube 20 and, by heat conduction through the walls of the tube 20, heats the lower pots more than the upper pots, whereas on its way down through the soil in the pots 12, it heats the upper pots more than the lower pots.

The bubbler/emitter 22 suitably serves as a bubbler for aerating the water.

Due to evaporation, it is necessary to add water into the system from time to time. This can be done by simply pouring water into the tank 2 through the access opening closed by the lid. In larger, more permanent installations, topping-up of the tanks 2 could also be effected automatically, by making use of the microswitch 44, which could control a solenoid valve opening and closing a supply line.

While the pots 12 shown are in the preferred shape of truncated pyramids with a square cross-section, other pot shapes are also possible, provided there is enough space for the plants to emerge between the superposed pots. It would thus be possible to use also conical pots 12, which could rest on the soil of the respective next-lower pot, or on trivet-like supports that have only three or four radial arms that would not interfere with plant growth. The illustrated shape is preferred with each upper pot being supported by the upper side walls of the next lower pot, as this arrangement does not lead to compaction of the porous-growing medium (which is preferably a mixture including perlite and vermiculite).

Also included may be a fertilizer metering system working in conjunction with the pump on the venturi principle (or others).

It is an important aspect of the present invention that the pots are of the same size or substantially the same size and there is no pyramid arrangement in the sense of the bottom pot being larger and the upper pots becoming progressively smaller. By maintaining the pots the same size, one achieves a substantially increased growing area per square unit of horizontal space. For example, in the growing of strawberries, one achieves at least four times the amount of crop density per square unit of horizontal space compared with conventional planting in flats or on the ground, and for the growth of tomatoes the increase is 9 times. In comparison, the use of a pyramidal configuration where the pots become increasingly smaller from the bottom to the top achieves at most a 50% increase in growing area.

For the growth of certain crops, it is also desirable, and indeed it may be essential for such crops, that the drainage holes be provided in the sidewalls, near the bottom of the pots. Thus, with crops which exhibit aggressive root growth, like tomatoes, providing holes only in the bottom may cause the holes to become clogged with root growth. On the other hand, because the sidewalls are exposed to light, the roots will not clog drainage holes provided in the sidewalls. For most crops, however, the root growth is not so aggressive as to cause clogging of drainage holes provided in the bottom wall.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A column planter comprising:

a tank adapted to contain water and having a polygonal shape;

a cover for said tank, including an access opening covered by a lid, said cover having a polygonal shape;

a plurality of planting pots stackable on top of each other, to form at least one column of stacked pots, each pot having a central opening in its bottom, as well as a plurality of drainage holes;

a substantially vertical, substantially rigid tube for each column, said tube having a lower end and an upper end and on which tube, with their central openings, are strung said pots of said column, the lower end of which tube is supported in said tank, said tube being of such length as to have its upper end protrude above a top of an uppermost pot in a column;

an emitter attached to the upper end of said vertical tube;

means for mounting and supporting said column of pots on said tank and comprising a pot-shaped recess provided in at least one corner of said cover, and a pump having an inlet and an outlet opening and adapted to draw water from said tank, which outlet opening is operatively connected the lower end of said vertical tube into which said pump forces said water drawn from said tank, to be issued from said emitter at the upper end of said tube, wherein water issuing from said emitter trickles down, passing from one pot into another pot therebelow through said drainage holes, and returns to said tank to be recirculated by said pump.

2. The planter as claimed in claim 1, wherein said pump is submersible.

3. The planter as claimed in claim 1, further comprising a filter device interposed between said pump and said vertical tubes.

4. The planter as claimed in claim 1, further comprising a float-actuated microswitch responsive to the water level in said tank.

5. The planter as claimed in claim 1, further comprising a submersed electrical heating element for heating the water of said tank.

6. A column planter comprising:

a tank adapted to contain water;

a plurality of planting pots each adapted to receive soil to provide a soil surface stackable on top of each other, to form at least one column of stacked pots, each pot having a central opening in its bottom, as well as a plurality of drainage holes;

a substantially vertical, substantially rigid tube for each column on which tube, with their central openings, are strung said pots of said column, the lower end of which tube is supported in said tank, said tube being of such length as to at least protrude beyond a soil surface of an uppermost pot in a column;

an emitter attached to the upper end of said vertical tube;

means for mounting and supporting said column of pots on said tank, a pump having an inlet and an outlet opening and adapted to draw water from said tank, which outlet opening is operatively connected to the lower end of said vertical tube into which said pump forces said water drawn from said tank, to be issued from said emitter at the upper end of said tube, wherein water issuing from said emitter trickles down, passing from one pot into another pot therebelow through said drainage holes, and returns to said tank to be recirculated by said pump, and a secondary support post extending upwardly from a central portion of said tanks, and stabilizing arms extending from said post to the upper ends of said rigid tubes.

7. The planter as claimed in claim 6, wherein said pump is submersible.

8. The planter as claimed in claim 6, further comprising a filter device interposed between said pump and said vertical tubes.

9. The planter as claimed in claim 6, further comprising a float-actuated microswitch responsive to the water level in said tank.

10. The planter as claimed in claim 6, further comprising a submersed electrical heating element for heating the water of said tank.

11. A column planter comprising:

a tank adapted to contain water;

a cover for said tank, including an access opening covered by a lid;

a plurality of planting pots stackable on top of each other, to form at least one column of stacked pots, each pot having a central opening in its bottom, as well as a plurality of drainage holes, wherein said pots are rectangular in horizontal cross-section, each said pot having a bottom wall and four upwardly extending sidewalls defining an upper edge, said pots being so dimensioned that they are stackable on top of each other by the bottom of an upper pot resting on the upper edge of a lower pot;

a substantially vertical, substantially rigid tube for each column, said tube having a lower end and an upper end and on which tube, with their central openings, are strung said pots of said column, the lower end of which tube is supported in said tank, said tube being of such length as to have its upper end protrude above a top of an uppermost pot in a column;

an emitter attached to the upper end of said vertical tube;

means for mounting and supporting said column of pots on said tank, and a pump having an inlet and an outlet opening and adapted to draw water from said tank, which outlet opening is operatively to draw water from said tank, which outlet opening is operatively connected the lower end of said vertical tube into which said pump forces said water drawn from said tank to be issued from said emitter at the upper end of said tube, wherein water issuing from said emitter trickles down, passing from one pot into another pot therebelow through said drainage holes, and returns to said tank to be recirculated by said pump.

12. The planter as claimed in claim 11, further comprising a filter device interposed between said pump and said vertical tubes, and a float-actuated microswitch responsive to the water level in said tank.

* * * * *